United States Patent
Krüger et al.

(10) Patent No.: US 11,084,650 B2
(45) Date of Patent: Aug. 10, 2021

(54) PORTION CAPSULE WITH A THREE-PLY NONWOVEN FABRIC

(71) Applicant: K-FEE SYSTEM GMBH, Bergisch Gladbach (DE)

(72) Inventors: Marc Krüger, Bergisch Gladbach (DE); Marco Hanisch, Overath (DE); Günter Empl, Bergisch Gladbach (DE)

(73) Assignee: K-FEE SYSTEM GMBH, Bergisch Gladbach (DE)

( * ) Notice: Subject to any disclaimer, the term of this patent is extended or adjusted under 35 U.S.C. 154(b) by 498 days.

(21) Appl. No.: 15/578,345

(22) PCT Filed: Jun. 9, 2016

(86) PCT No.: PCT/EP2016/063186
§ 371 (c)(1),
(2) Date: Nov. 30, 2017

(87) PCT Pub. No.: WO2016/198534
PCT Pub. Date: Dec. 15, 2016

(65) Prior Publication Data
US 2018/0170664 A1  Jun. 21, 2018

(30) Foreign Application Priority Data
Jun. 10, 2015  (DE) .......................... 102015210606.3

(51) Int. Cl.
*B65D 85/804*  (2006.01)
*B32B 5/02*  (2006.01)
(Continued)

(52) U.S. Cl.
CPC .......... *B65D 85/8046* (2013.01); *B32B 5/022* (2013.01); *B32B 5/26* (2013.01);
(Continued)

(58) Field of Classification Search
CPC ............ B65D 85/8046; B65D 85/8043; B32B 5/022; B32B 5/26; B32B 7/12;
(Continued)

(56) References Cited

U.S. PATENT DOCUMENTS 2,778,739 A  1/1957  Rodth
3,183,096 A  5/1965  Hiscock
(Continued)

FOREIGN PATENT DOCUMENTS

AU  2011304736 A1  8/2012
AU  2011281237 A1  2/2013
(Continued)

OTHER PUBLICATIONS

International Search Report for International Application No. PCT/EP2016/063186, dated Aug. 1, 2016.
(Continued)

*Primary Examiner* — Moshe Wilensky
*Assistant Examiner* — Kyle A Cook
(74) *Attorney, Agent, or Firm* — The Dobrusin Law Firm, P.C.

(57) ABSTRACT

The invention relates to a portion capsule for producing a beverage, having a capsule body with a capsule base and a filling side. A cavity for receiving a pulverulent or liquid beverage substrate is formed between the capsule base and the filling side, and a filter element is arranged between the beverage substrate and the capsule base. The filter element comprises an open-pore felt and/or nonwoven fabric, and the felt and/or nonwoven fabric has a first average pore size in a first region facing the beverage substrate and a second average pore size in a second region facing the capsule base, said first pore size being smaller than the second pore size.

14 Claims, 1 Drawing Sheet

(51) Int. Cl.
*B32B 5/26* (2006.01)
*B32B 7/12* (2006.01)

(52) U.S. Cl.
CPC ............ *B32B 7/12* (2013.01); *B65D 85/8043* (2013.01); *B32B 2250/03* (2013.01); *B32B 2250/20* (2013.01); *B32B 2262/0253* (2013.01); *B32B 2262/0276* (2013.01); *B32B 2307/718* (2013.01); *B32B 2307/732* (2013.01)

(58) Field of Classification Search
CPC ............ B32B 2250/03; B32B 2250/20; B32B 2262/0253; B32B 2262/0276; B32B 2307/718; B32B 2307/732
See application file for complete search history.

(56) References Cited

U.S. PATENT DOCUMENTS

| | | |
|---|---|---|
| 3,631,793 A | 1/1972 | Bednartz |
| 3,640,727 A | 2/1972 | Heusinkveld |
| 4,298,649 A | 11/1981 | Meitner |
| 4,534,985 A | 8/1985 | Gasau |
| 4,540,595 A | 9/1985 | Acitelli et al. |
| 4,676,482 A | 4/1987 | Reece |
| 4,644,151 A | 5/1987 | Piet |
| 4,742,645 A | 5/1988 | Johnston |
| 4,859,337 A | 8/1989 | Woltermann |
| 4,860,645 A | 8/1989 | Van Der Lijn et al. |
| 4,867,993 A | 9/1989 | Nordskog |
| 4,976,179 A | 12/1990 | Lacrouts-Cazenave |
| 4,995,310 A | 2/1991 | Van Der Lijn et al. |
| 5,012,629 A | 5/1991 | Rehman et al. |
| 5,028,769 A | 7/1991 | Claypool et al. |
| 5,108,768 A | 4/1992 | So |
| 5,242,702 A | 9/1993 | Fond |
| 5,243,164 A | 9/1993 | Erickson et al. |
| 5,251,758 A | 10/1993 | Kolacek |
| 5,285,041 A | 2/1994 | Wright |
| 5,298,267 A | 3/1994 | Gruenbacher |
| 5,325,765 A | 7/1994 | Sylvan et al. |
| 5,352,765 A | 10/1994 | Drent et al. |
| 5,460,078 A | 10/1995 | Weller |
| 5,472,719 A | 12/1995 | Favre |
| 5,496,573 A | 3/1996 | Tsuji et al. |
| 5,501,945 A | 3/1996 | Kanakkanatt |
| 5,535,765 A | 7/1996 | Takashima |
| 5,601,716 A | 2/1997 | Heinrich et al. |
| 5,637,850 A | 6/1997 | Honda |
| 5,638,740 A | 6/1997 | Cai |
| 5,649,472 A | 7/1997 | Fond et al. |
| 5,656,311 A | 8/1997 | Fond |
| 5,672,368 A | 9/1997 | Perkins |
| 5,677,522 A | 10/1997 | Rice et al. |
| 5,725,261 A | 3/1998 | Rahn |
| 5,840,189 A | 11/1998 | Sylvan et al. |
| 5,888,549 A | 3/1999 | Buchholz et al. |
| 5,895,672 A | 4/1999 | Cooper |
| 5,917,165 A | 6/1999 | Platt et al. |
| 5,941,055 A | 8/1999 | Coates |
| 5,948,455 A | 9/1999 | Schaeffer et al. |
| 5,980,743 A | 11/1999 | Bairischer |
| 5,994,677 A | 11/1999 | Akerlind |
| 6,153,026 A | 11/2000 | Michotte |
| 6,189,438 B1 | 2/2001 | Bielfeldt et al. |
| 6,199,780 B1 | 3/2001 | Görlitz |
| 6,202,929 B1 | 3/2001 | Verschuur et al. |
| 6,299,926 B1 | 10/2001 | Balakrishnan et al. |
| 6,440,256 B1 | 8/2002 | Gordon et al. |
| 6,451,332 B1 | 9/2002 | Tanaka et al. |
| 6,589,577 B2 | 7/2003 | Lazaris et al. |
| 6,598,800 B1 | 7/2003 | Schmit et al. |
| 6,607,762 B2 | 8/2003 | Lazaris et al. |
| 6,627,244 B2 | 9/2003 | Omura |
| 6,645,537 B2 | 11/2003 | Sweeney et al. |
| 6,655,260 B2 | 12/2003 | Lazaris |
| 6,706,652 B2 | 3/2004 | Groten et al. |
| 6,854,378 B2 | 2/2005 | Jarisch et al. |
| 6,861,086 B2 | 3/2005 | Buckingham et al. |
| 6,880,454 B2 | 4/2005 | Kollep |
| 6,948,420 B2 | 9/2005 | Kirschner et al. |
| 6,994,879 B2 | 2/2006 | Cirigliano et al. |
| 7,408,094 B2 | 8/2008 | Little et al. |
| 7,444,925 B2 | 11/2008 | Mahlich |
| 7,464,518 B2 | 12/2008 | Ansinn |
| 7,543,527 B2 | 6/2009 | Schmed |
| 7,552,672 B2 | 6/2009 | Schmed |
| 7,595,870 B2 | 9/2009 | Ringlien |
| 7,673,558 B2 | 3/2010 | Panesar et al. |
| 7,678,451 B2 | 3/2010 | Gelissen et al. |
| 7,685,930 B2 | 3/2010 | Mandralis et al. |
| 7,703,381 B2 | 4/2010 | Liverani et al. |
| 7,763,295 B2 | 7/2010 | Mayr et al. |
| 7,815,953 B2 | 10/2010 | Mastropasqua et al. |
| 7,935,646 B2 | 5/2011 | Viazmensky et al. |
| 7,946,217 B2 | 5/2011 | Favre et al. |
| 7,981,451 B2 | 7/2011 | Ozanne |
| 8,039,029 B2 | 10/2011 | Ozanne |
| 8,039,034 B2 | 10/2011 | Ozanne |
| 8,088,423 B2 | 1/2012 | Ohresser et al. |
| 8,109,200 B2 | 2/2012 | Hansen |
| 8,114,461 B2 | 2/2012 | Perlman et al. |
| 8,163,318 B2 | 4/2012 | Ozanne et al. |
| 8,168,908 B2 | 5/2012 | Heimann |
| 8,257,766 B2 | 9/2012 | Yoakim et al. |
| 8,276,639 B2 | 10/2012 | Binacchi |
| 8,304,006 B2 | 11/2012 | Yoakim et al. |
| 8,307,754 B2 | 11/2012 | Trenite et al. |
| 8,322,271 B2 | 12/2012 | Glucksman et al. |
| 8,361,527 B2 | 1/2013 | Winkler et al. |
| 8,474,368 B2 | 7/2013 | Kilber et al. |
| 8,491,948 B2 | 7/2013 | Ozanne et al. |
| 8,491,976 B2 | 7/2013 | Sato et al. |
| 8,505,440 B2 | 8/2013 | Kirschner et al. |
| 8,512,886 B2 | 8/2013 | Ozanne |
| 8,720,320 B1 | 5/2014 | Rivera |
| 8,734,881 B2 | 5/2014 | Yoakim et al. |
| 8,747,775 B2 | 6/2014 | Sandvick |
| 8,794,125 B1 | 8/2014 | Rivera |
| 8,906,436 B2 | 12/2014 | Nowak |
| 8,916,220 B2 | 12/2014 | Mahlich et al. |
| 8,956,672 B2 | 2/2015 | Yoakim et al. |
| 8,960,076 B2 | 2/2015 | Epars et al. |
| 8,986,762 B2 | 3/2015 | Eichler et al. |
| 9,049,958 B2 | 6/2015 | Fischer |
| 9,072,402 B2 | 7/2015 | Ryser |
| 9,079,705 B2 | 7/2015 | Digiuni |
| 9,125,515 B2 | 9/2015 | Aardenburg |
| 9,150,347 B2 | 10/2015 | Scheiber |
| 9,204,751 B2 | 12/2015 | Peterson |
| 9,216,854 B2 | 12/2015 | Schreiber |
| 9,226,611 B2 | 1/2016 | Yoakim et al. |
| 9,242,791 B2 | 1/2016 | Denisart et al. |
| 9,271,602 B2 | 3/2016 | Beaulieu et al. |
| 9,277,837 B2 | 3/2016 | Yoakim et al. |
| 9,290,317 B2 | 3/2016 | Quinn et al. |
| 9,295,278 B2 | 3/2016 | Nowak |
| 9,357,791 B2 | 6/2016 | Fountain et al. |
| 9,359,126 B2 | 6/2016 | Wong et al. |
| 9,359,128 B2 | 6/2016 | Mahlich |
| 9,392,902 B2 | 7/2016 | Parentes et al. |
| 9,394,101 B2 | 7/2016 | Empl |
| 9,399,546 B2 | 7/2016 | Abegglen et al. |
| 9,409,703 B2 | 8/2016 | Krüger et al. |
| 9,409,704 B2 | 8/2016 | Digiuni et al. |
| 9,415,931 B2 | 8/2016 | Gerbaulet et al. |
| 9,428,328 B2 | 8/2016 | Trombetta et al. |
| 9,428,329 B2 | 8/2016 | Trombetta et al. |
| 9,434,525 B2 | 9/2016 | Fabozzi et al. |
| 9,486,108 B1 | 11/2016 | Douglas et al. |
| 9,598,230 B2 | 3/2017 | Schmed et al. |
| 9,603,478 B2 | 3/2017 | Deleo |
| 9,656,798 B2 | 5/2017 | Kamerbeek et al. |
| 9,808,112 B2 | 11/2017 | Favero et al. |
| 9,969,546 B2 | 5/2018 | Krüger et al. |

(56) References Cited

U.S. PATENT DOCUMENTS

| | | |
|---|---|---|
| 10,004,362 B2 | 6/2018 | Yang |
| 10,011,421 B2 | 7/2018 | Bartoli et al. |
| 10,111,554 B2 | 10/2018 | Roberts et al. |
| 10,342,377 B2 | 7/2019 | Cable et al. |
| 10,343,838 B2 | 7/2019 | Empl |
| 10,376,089 B2 | 8/2019 | Deuber et al. |
| 10,450,130 B2 | 10/2019 | Hansen |
| 10,455,974 B2 | 10/2019 | Talon |
| 10,472,165 B2 | 11/2019 | Empl |
| 2001/0014393 A1 | 8/2001 | Groten et al. |
| 2001/0038204 A1 | 11/2001 | Nojima et al. |
| 2001/0047724 A1 | 12/2001 | Lazaris |
| 2001/0048957 A1 | 12/2001 | Lazaris et al. |
| 2002/0020659 A1 | 2/2002 | Sweeney |
| 2002/0048621 A1 | 4/2002 | Boyd et al. |
| 2002/0085164 A1 | 7/2002 | Stanford-Clark |
| 2002/0088807 A1 | 7/2002 | Perkovic et al. |
| 2002/0110626 A1 | 8/2002 | Buckingham et al. |
| 2003/0005826 A1 | 1/2003 | Sargent et al. |
| 2003/0033938 A1 | 2/2003 | Halliday et al. |
| 2003/0039731 A1 | 2/2003 | Dalton et al. |
| 2003/0116029 A1 | 6/2003 | Kollep |
| 2003/0121979 A1 | 7/2003 | Haens et al. |
| 2003/0148096 A1 | 8/2003 | Groten et al. |
| 2003/0172813 A1 | 9/2003 | Schifferle |
| 2003/0217644 A1 | 11/2003 | Jarisch et al. |
| 2003/0222089 A1 | 12/2003 | Hale |
| 2004/0005384 A1 | 1/2004 | Cai |
| 2004/0045443 A1 | 3/2004 | Lazaris et al. |
| 2004/0089158 A1 | 5/2004 | Mahlich |
| 2004/0089602 A1 | 5/2004 | Heinrich et al. |
| 2004/0115310 A1 | 6/2004 | Yoakim et al. |
| 2004/0118295 A1 | 6/2004 | Angeles |
| 2004/0142070 A1 | 7/2004 | Haen |
| 2004/0155113 A1 | 8/2004 | Urano et al. |
| 2004/0182250 A1 | 9/2004 | Halliday et al. |
| 2004/0228955 A1 | 11/2004 | Denisart et al. |
| 2004/0231521 A1 | 11/2004 | Yoakim |
| 2005/0016383 A1 | 1/2005 | Kirschner et al. |
| 2005/0045566 A1 | 3/2005 | Larkin et al. |
| 2005/0051478 A1 | 3/2005 | Karanikos et al. |
| 2005/0056153 A1 | 3/2005 | Nottingham et al. |
| 2005/0061478 A1 | 3/2005 | Huang |
| 2005/0136155 A1 | 6/2005 | Jordan et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0158437 A1 | 7/2005 | Itaya et al. |
| 2005/0160919 A1 | 7/2005 | Balkau |
| 2005/0166763 A1 | 8/2005 | Scarchilli et al. |
| 2005/0183581 A1 | 8/2005 | Kirschner et al. |
| 2005/0266122 A1 | 12/2005 | Franceschi |
| 2006/0010744 A1 | 1/2006 | Schumacher |
| 2006/0032427 A1 | 2/2006 | Ishii et al. |
| 2006/0065127 A1 | 3/2006 | Dalton et al. |
| 2006/0074165 A1 | 4/2006 | Gelissen et al. |
| 2006/0084344 A1 | 4/2006 | Bonneh |
| 2006/0107841 A1 | 5/2006 | Schifferle |
| 2006/0110507 A1 | 5/2006 | Yoakim et al. |
| 2006/0148968 A1 | 7/2006 | Van Duijnhoven et al. |
| 2006/0194004 A1 | 8/2006 | Niemoller et al. |
| 2006/0228447 A1 | 10/2006 | Ganesan et al. |
| 2006/0236871 A1 | 10/2006 | Ternite et al. |
| 2006/0280841 A1 | 12/2006 | Cai |
| 2007/0148290 A1 | 6/2007 | Ternite et al. |
| 2007/0157821 A1 | 7/2007 | Panesar et al. |
| 2007/0181005 A1 | 8/2007 | Kirschner et al. |
| 2007/0181412 A1 | 8/2007 | Raunig |
| 2007/0203587 A1 | 8/2007 | Erlandsson et al. |
| 2007/0257118 A1 | 11/2007 | Riley et al. |
| 2008/0024536 A1 | 1/2008 | Hirano et al. |
| 2008/0028946 A1 | 2/2008 | Kirschner et al. |
| 2008/0038441 A1 | 2/2008 | Kirschner |
| 2008/0050488 A1 | 2/2008 | Koeling et al. |
| 2008/0085356 A1 | 4/2008 | Colliver et al. |
| 2008/0148948 A1 | 6/2008 | Evers et al. |
| 2008/0187638 A1 | 8/2008 | Hansen |
| 2008/0245236 A1 | 10/2008 | Ternite et al. |
| 2008/0299262 A1 | 12/2008 | Reati |
| 2008/0302251 A1 | 12/2008 | Rijskamp et al. |
| 2009/0004343 A1 | 1/2009 | Xiong et al. |
| 2009/0007793 A1 | 1/2009 | Glucksman et al. |
| 2009/0007796 A1 | 1/2009 | Ricotti |
| 2009/0092711 A1 | 4/2009 | Ninh et al. |
| 2009/0126577 A1 | 5/2009 | Ternite |
| 2009/0136626 A1 | 5/2009 | Mueller |
| 2009/0139926 A1 | 6/2009 | Hassenbauck |
| 2009/0173043 A1 | 7/2009 | Bloome et al. |
| 2009/0211458 A1 | 8/2009 | Denisart et al. |
| 2009/0211713 A1 | 8/2009 | Binacchi |
| 2009/0285953 A1 | 11/2009 | Reniers |
| 2009/0289121 A1 | 11/2009 | Maeda et al. |
| 2009/0291379 A1 | 11/2009 | Oota et al. |
| 2009/0324788 A1 | 12/2009 | Roy et al. |
| 2009/0324791 A1 | 12/2009 | Ohresser et al. |
| 2010/0000667 A1 | 1/2010 | Funnell |
| 2010/0028495 A1 | 2/2010 | Novak et al. |
| 2010/0050880 A1 | 3/2010 | Suter et al. |
| 2010/0051532 A1 | 3/2010 | Wawrla et al. |
| 2010/0054532 A1 | 3/2010 | Mitte et al. |
| 2010/0078480 A1 | 4/2010 | Aker |
| 2010/0108541 A1 | 5/2010 | Venturi |
| 2010/0132564 A1 | 6/2010 | Ozanne et al. |
| 2010/0178404 A1 | 7/2010 | Yoakim et al. |
| 2010/0181378 A1 | 7/2010 | Hayakawa et al. |
| 2010/0196545 A1 | 8/2010 | Buffet et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260915 A1 | 10/2010 | Young |
| 2010/0263329 A1 | 10/2010 | Nash |
| 2010/0264640 A1 | 10/2010 | Lane et al. |
| 2010/0288131 A1 | 11/2010 | Kilber et al. |
| 2010/0288133 A1 | 11/2010 | Litzka et al. |
| 2010/0303964 A1 | 12/2010 | Beaulieu et al. |
| 2010/0308397 A1 | 12/2010 | Ariyoshi |
| 2011/0005399 A1 | 1/2011 | Epars et al. |
| 2011/0012291 A1 | 1/2011 | Middleton et al. |
| 2011/0020500 A1 | 1/2011 | Eichler et al. |
| 2011/0033580 A1 | 2/2011 | Biesheuvel et al. |
| 2011/0041702 A1 | 2/2011 | Yoakim |
| 2011/0064852 A1 | 3/2011 | Mann |
| 2011/0076361 A1 | 3/2011 | Peterson et al. |
| 2011/0097450 A1 | 4/2011 | Krüger |
| 2011/0142996 A1 | 6/2011 | Krüger |
| 2011/0185910 A1 | 8/2011 | Ryser |
| 2011/0186450 A1 | 8/2011 | Bonacci |
| 2011/0189350 A1 | 8/2011 | Van Belleghem et al. |
| 2011/0200725 A1 | 8/2011 | Kollep et al. |
| 2011/0212225 A1 | 9/2011 | Mariller |
| 2011/0217421 A1 | 9/2011 | Perentes et al. |
| 2011/0250333 A1 | 10/2011 | Ozanne |
| 2011/0250812 A1 | 10/2011 | Pourdeyhimi et al. |
| 2011/0303095 A1 | 12/2011 | Fu et al. |
| 2011/0308397 A1 | 12/2011 | Sinot et al. |
| 2012/0006685 A1 | 1/2012 | Van Engelen |
| 2012/0015080 A1 | 1/2012 | Roulin et al. |
| 2012/0038063 A1 | 2/2012 | Meyer et al. |
| 2012/0058226 A1 | 3/2012 | Winkler et al. |
| 2012/0060697 A1 | 3/2012 | Ozanne |
| 2012/0070542 A1 | 3/2012 | Camera et al. |
| 2012/0070543 A1 | 3/2012 | Mahlich |
| 2012/0070551 A1 | 3/2012 | Mahlich |
| 2012/0073418 A1 | 3/2012 | Aardenburg |
| 2012/0073452 A1* | 3/2012 | Gold ............... A47J 29/06 99/426 |
| 2012/0090473 A1 | 4/2012 | Deuber |
| 2012/0097041 A1 | 4/2012 | Bucher et al. |
| 2012/0097602 A1 | 4/2012 | Tedford |
| 2012/0100264 A1 | 4/2012 | Bucher et al. |
| 2012/0109186 A1 | 5/2012 | Parrott et al. |
| 2012/0121765 A1 | 5/2012 | Kamerbeek et al. |
| 2012/0123106 A1 | 5/2012 | Joos |
| 2012/0126834 A1 | 5/2012 | Kleinhans |

(56) References Cited

U.S. PATENT DOCUMENTS

| | | |
|---|---|---|
| 2012/0148709 A1 | 6/2012 | Kamerbeek et al. |
| 2012/0177788 A1 | 7/2012 | Seid et al. |
| 2012/0180670 A1 | 7/2012 | Yoakim et al. |
| 2012/0183657 A1 | 7/2012 | Marina et al. |
| 2012/0195155 A1 | 8/2012 | Gennai et al. |
| 2012/0201933 A1 | 8/2012 | Dran et al. |
| 2012/0207893 A1 | 8/2012 | Krüger |
| 2012/0207895 A1 | 8/2012 | Rivera |
| 2012/0251668 A1 | 10/2012 | Wong et al. |
| 2012/0251672 A1 | 10/2012 | Kamerbeek et al. |
| 2012/0251694 A1 | 10/2012 | Kamerbeek et al. |
| 2012/0258210 A1 | 10/2012 | Wong et al. |
| 2012/0295234 A1 | 11/2012 | Rognon et al. |
| 2012/0301581 A1 | 11/2012 | Abegglen et al. |
| 2012/0308688 A1 | 12/2012 | Peterson et al. |
| 2013/0055903 A1 | 3/2013 | Deuber |
| 2013/0059039 A1 | 3/2013 | Trombetta et al. |
| 2013/0064929 A1 | 3/2013 | Jarisch et al. |
| 2013/0064937 A1 | 3/2013 | Jarisch et al. |
| 2013/0084363 A1 | 4/2013 | Krüger et al. |
| 2013/0084376 A1 | 4/2013 | Fischer et al. |
| 2013/0087051 A1 | 4/2013 | Frydman |
| 2013/0099597 A1 | 4/2013 | Perentes et al. |
| 2013/0101716 A1 | 4/2013 | Beaulieu et al. |
| 2013/0122153 A1 | 5/2013 | Ferrier et al. |
| 2013/0122167 A1 | 5/2013 | Winkler et al. |
| 2013/0125762 A1 | 5/2013 | Dogan et al. |
| 2013/0129872 A1 | 5/2013 | Krüger et al. |
| 2013/0136828 A1 | 5/2013 | Anghileri |
| 2013/0149424 A1 | 6/2013 | Fischer |
| 2013/0156897 A1 | 6/2013 | Goldstein |
| 2013/0156899 A1 | 6/2013 | Quinn et al. |
| 2013/0206011 A1 | 8/2013 | Ozanne et al. |
| 2013/0209618 A1 | 8/2013 | Trombetta et al. |
| 2013/0209619 A1 | 8/2013 | Mahlich |
| 2013/0209620 A1 | 8/2013 | Ozanne et al. |
| 2013/0209622 A1 | 8/2013 | Fountain et al. |
| 2013/0216663 A1 | 8/2013 | Dogan et al. |
| 2013/0224343 A1 | 8/2013 | Tremblay |
| 2013/0230627 A1 | 9/2013 | Hansen et al. |
| 2013/0243910 A1 | 9/2013 | Krüger et al. |
| 2013/0312619 A1 | 11/2013 | Spiegel et al. |
| 2013/0323366 A1 | 12/2013 | Gerbaulet et al. |
| 2013/0327223 A1 | 12/2013 | Bartoli et al. |
| 2013/0341478 A1 | 12/2013 | Mariller |
| 2014/0001563 A1 | 1/2014 | Krüger et al. |
| 2014/0004231 A1 | 1/2014 | Norton et al. |
| 2014/0017359 A1 | 1/2014 | Krüger et al. |
| 2014/0026761 A1 | 1/2014 | Bartoli et al. |
| 2014/0127364 A1 | 5/2014 | Fu et al. |
| 2014/0141128 A1 | 5/2014 | Trombetta et al. |
| 2014/0141129 A1 | 5/2014 | Greene |
| 2014/0157993 A1 | 6/2014 | Brouwer et al. |
| 2014/0161936 A1 | 6/2014 | Trombetta et al. |
| 2014/0178538 A1 | 6/2014 | Husband et al. |
| 2014/0196608 A1 | 7/2014 | Amrein et al. |
| 2014/0220191 A1 | 8/2014 | Kelly et al. |
| 2014/0224130 A1 | 8/2014 | Castellani et al. |
| 2014/0230370 A1 | 8/2014 | Bianchi |
| 2014/0263033 A1 | 9/2014 | Fu et al. |
| 2014/0272018 A1 | 9/2014 | Koller et al. |
| 2014/0287104 A1 | 9/2014 | Austin et al. |
| 2014/0287105 A1 | 9/2014 | Husband et al. |
| 2014/0346022 A1 | 11/2014 | Keller et al. |
| 2014/0348984 A1 | 11/2014 | Zeller et al. |
| 2014/0370181 A1 | 12/2014 | Young et al. |
| 2015/0010680 A9 | 1/2015 | Mahlich |
| 2015/0020481 A1 | 1/2015 | Hodler |
| 2015/0029702 A1 | 1/2015 | Foley |
| 2015/0056331 A1 | 2/2015 | Rivera |
| 2015/0056340 A1 | 2/2015 | Trombetta et al. |
| 2015/0056351 A1 | 2/2015 | Deuber |
| 2015/0079241 A1 | 3/2015 | Mahlich |
| 2015/0119220 A1 | 4/2015 | Rea et al. |
| 2015/0128525 A1 | 5/2015 | Bartoli et al. |
| 2015/0132441 A1 | 5/2015 | Accursi |
| 2015/0157164 A1 | 6/2015 | Digiuni |
| 2015/0158665 A1 | 6/2015 | Krüger et al. |
| 2015/0158666 A1 | 6/2015 | Krüger et al. |
| 2015/0166204 A1 | 6/2015 | Rea et al. |
| 2015/0173558 A1 | 6/2015 | Cross et al. |
| 2015/0175347 A1 | 6/2015 | Empl |
| 2015/0191302 A1 | 7/2015 | Gerbaulet et al. |
| 2015/0201790 A1 | 7/2015 | Smith et al. |
| 2015/0239204 A1* | 8/2015 | Takebe .................. D04H 1/559 442/382 |
| 2015/0239652 A1 | 8/2015 | Trombetta et al. |
| 2015/0239653 A1 | 8/2015 | Dogan et al. |
| 2015/0246741 A1 | 9/2015 | Hansen et al. |
| 2015/0274411 A1 | 10/2015 | Krüger et al. |
| 2015/0297021 A1 | 10/2015 | Bugnano et al. |
| 2015/0297023 A1 | 10/2015 | Hansen et al. |
| 2015/0314954 A1 | 11/2015 | Empl |
| 2015/0329282 A1 | 11/2015 | Bartoli et al. |
| 2015/0344220 A1 | 12/2015 | Sanders |
| 2015/0353275 A1 | 12/2015 | Accursi |
| 2015/0366397 A1 | 12/2015 | Flick et al. |
| 2015/0375926 A1 | 12/2015 | Fischer |
| 2016/0000254 A1 | 1/2016 | Deleo |
| 2016/0001968 A1 | 1/2016 | Krüger et al. |
| 2016/0037961 A1 | 2/2016 | Digiuni |
| 2016/0045060 A1 | 2/2016 | Flick |
| 2016/0058234 A1 | 3/2016 | Eppler et al. |
| 2016/0066591 A1 | 3/2016 | Halliday et al. |
| 2016/0075506 A1 | 3/2016 | Chapman et al. |
| 2016/0174754 A1 | 6/2016 | Flick et al. |
| 2016/0194146 A1 | 7/2016 | Schelch et al. |
| 2016/0198889 A1 | 7/2016 | Flick et al. |
| 2016/0207696 A9 | 7/2016 | Trombetta et al. |
| 2016/0242594 A1 | 8/2016 | Empl et al. |
| 2016/0251150 A1 | 9/2016 | Macchi et al. |
| 2016/0255987 A1 | 9/2016 | De Graaff et al. |
| 2016/0280453 A1 | 9/2016 | Accursi |
| 2016/0325921 A1 | 11/2016 | Empl |
| 2016/0332759 A1 | 11/2016 | Trombetta et al. |
| 2016/0338528 A1 | 11/2016 | Yui et al. |
| 2016/0340110 A1 | 11/2016 | Trombetta et al. |
| 2017/0008694 A1 | 1/2017 | Andreae et al. |
| 2017/0020329 A1 | 1/2017 | Douglas et al. |
| 2017/0027374 A1 | 2/2017 | Smith et al. |
| 2017/0051800 A1 | 2/2017 | Hill et al. |
| 2017/0055757 A1 | 3/2017 | Fu et al. |
| 2017/0081111 A1* | 3/2017 | Wicks ................ B65D 77/2024 |
| 2017/0119198 A1 | 5/2017 | Barber |
| 2017/0174417 A1 | 6/2017 | Nordqvist et al. |
| 2017/0183145 A1 | 6/2017 | Cabilli et al. |
| 2017/0231421 A1 | 8/2017 | Talon |
| 2017/0362020 A1 | 12/2017 | Hanneson et al. |
| 2018/0105355 A1 | 4/2018 | Harif |
| 2018/0194545 A1 | 7/2018 | Bisio |
| 2018/0303281 A1 | 10/2018 | Carr et al. |
| 2019/0208950 A1 | 7/2019 | Wong et al. |

FOREIGN PATENT DOCUMENTS

| | | |
|---|---|---|
| AU | 2014203212 A1 | 7/2014 |
| CA | 2436389 A1 | 8/2002 |
| CA | 2327021 C | 1/2005 |
| CA | 2400033 C | 2/2005 |
| CA | 2399290 C | 1/2006 |
| CA | 2399283 C | 5/2007 |
| CA | 2661921 A1 | 3/2008 |
| CA | 2763746 A1 | 3/2010 |
| CA | 2784752 C | 6/2011 |
| CA | 2662071 C | 7/2011 |
| CA | 2538256 C | 8/2011 |
| CA | 2824135 A1 | 12/2011 |
| CA | 2805839 A1 | 1/2012 |
| CA | 2810237 A1 | 3/2012 |
| CA | 2531544 C | 5/2012 |
| CA | 2831304 A1 | 10/2012 |
| CA | 2839293 A1 | 12/2012 |
| CA | 2662069 C | 1/2013 |
| CA | 2785843 A1 | 2/2013 |

(56) References Cited

FOREIGN PATENT DOCUMENTS

| | | | |
|---|---|---|---|
| CA | 2788283 A1 | 3/2013 |
| CA | 2850010 A1 | 5/2013 |
| CA | 2810236 C | 7/2013 |
| CA | 2866119 A1 | 9/2013 |
| CA | 2872667 A1 | 11/2013 |
| CA | 2874025 A1 | 12/2013 |
| CA | 2874070 A1 | 12/2013 |
| CA | 2877027 A1 | 12/2013 |
| CA | 2877090 A1 | 1/2014 |
| CA | 2888129 A1 | 4/2014 |
| CA | 2888658 C | 6/2014 |
| CA | 2898173 A1 | 8/2014 |
| CA | 2902231 A1 | 8/2014 |
| CA | 2905188 A1 | 9/2014 |
| CA | 2901582 A1 | 11/2014 |
| CA | 2901664 A1 | 11/2014 |
| CA | 2922822 A1 | 2/2015 |
| CA | 2922824 A1 | 2/2015 |
| CA | 2832794 C | 3/2016 |
| CA | 2833096 C | 5/2016 |
| CN | 101016667 A | 8/2007 |
| CN | 101043835 A | 9/2007 |
| CN | 101090657 A | 12/2007 |
| CN | 101263066 A | 9/2008 |
| CN | 101646613 A | 2/2010 |
| CN | 101801248 A | 8/2010 |
| CN | 101828840 A | 9/2010 |
| CN | 101970314 A | 2/2011 |
| CN | 101992905 A | 3/2011 |
| CN | 102365214 A | 2/2012 |
| CN | 102379630 A | 3/2012 |
| CN | 102574631 A | 7/2012 |
| CN | 102574633 A | 7/2012 |
| CN | 102741135 A | 10/2012 |
| CN | 102741136 A | 10/2012 |
| CN | 102791595 A | 11/2012 |
| CN | 102958408 A | 3/2013 |
| CN | 103476687 A | 12/2013 |
| CN | 103501624 A | 1/2014 |
| CN | 204048139 U | 12/2014 |
| CN | 104334473 A | 2/2015 |
| CN | 104411600 A | 3/2015 |
| CN | 104528167 A | 4/2015 |
| CN | 104603029 A | 5/2015 |
| CN | 104619607 A | 5/2015 |
| DE | 1207866 B | 12/1965 |
| DE | 1221960 B | 7/1966 |
| DE | 3100115 A1 | 11/1981 |
| DE | 69615001 T2 | 3/2002 |
| DE | 102004056224 A1 | 5/2006 |
| DE | 202006003115 U1 | 5/2006 |
| DE | 102006004329 A1 | 8/2007 |
| DE | 202009014945 U1 | 9/2010 |
| DE | 202010007919 U1 | 11/2010 |
| DE | 102010027485 A1 | 1/2012 |
| DE | 102010034206 A1 | 2/2012 |
| DE | 102011012881 A1 | 3/2012 |
| DE | 202012101513 U1 | 5/2012 |
| DE | 102011010534 A1 | 8/2012 |
| DE | 102011115833 A1 | 4/2013 |
| DE | 102012105282 A1 | 12/2013 |
| DE | 102012110446 A1 | 1/2014 |
| DE | 102012109186 A1 | 3/2014 |
| DE | 102013215274 A1 | 8/2014 |
| DE | 102014018470 A1 | 6/2016 |
| EP | 0224297 A1 | 6/1987 |
| EP | 0244339 A1 | 11/1987 |
| EP | 0338479 A1 | 10/1989 |
| EP | 453573 A1 | 10/1991 |
| EP | 0468078 A1 | 1/1992 |
| EP | 0468079 A1 | 1/1992 |
| EP | 0656224 A1 | 6/1995 |
| EP | 0859467 A1 | 8/1998 |
| EP | 0865749 A1 | 9/1998 |
| EP | 0923865 A2 | 6/1999 |
| EP | 1118305 A2 | 7/2001 |
| EP | 1129623 A1 | 9/2001 |
| EP | 1167204 A1 | 1/2002 |
| EP | 1221418 A1 | 7/2002 |
| EP | 1263661 A1 | 12/2002 |
| EP | 1344722 A1 | 9/2003 |
| EP | 1344724 A1 | 9/2003 |
| EP | 1363501 A2 | 11/2003 |
| EP | 1471012 A2 | 10/2004 |
| EP | 1500358 A1 | 1/2005 |
| EP | 1555219 A1 | 7/2005 |
| EP | 1559351 A2 | 8/2005 |
| EP | 1566127 A2 | 8/2005 |
| EP | 1567594 A1 | 8/2005 |
| EP | 1567595 A1 | 8/2005 |
| EP | 1586534 A1 | 10/2005 |
| EP | 1710173 A1 | 10/2006 |
| EP | 1792850 B1 | 6/2007 |
| EP | 1796516 A2 | 6/2007 |
| EP | 1849718 A1 | 10/2007 |
| EP | 1882432 B1 | 1/2008 |
| EP | 1892199 A1 | 2/2008 |
| EP | 1974638 A1 | 10/2008 |
| EP | 1997748 A1 | 12/2008 |
| EP | 2158829 A1 | 3/2010 |
| EP | 1882431 B1 | 4/2010 |
| EP | 2218653 A1 | 8/2010 |
| EP | 2230195 A1 | 9/2010 |
| EP | 2239211 A1 | 10/2010 |
| EP | 2284102 A1 | 2/2011 |
| EP | 2287090 A1 | 2/2011 |
| EP | 1894499 A1 | 7/2011 |
| EP | 2345352 A1 | 7/2011 |
| EP | 2364930 A2 | 9/2011 |
| EP | 2384133 B1 | 11/2011 |
| EP | 2412645 A1 | 2/2012 |
| EP | 2412646 A1 | 2/2012 |
| EP | 2444339 A1 | 4/2012 |
| EP | 2465792 A2 | 6/2012 |
| EP | 2476633 A1 | 7/2012 |
| EP | 2484505 A2 | 8/2012 |
| EP | 2484605 A1 | 8/2012 |
| EP | 2510805 A2 | 10/2012 |
| EP | 2343247 B1 | 11/2012 |
| EP | 2537778 A1 | 12/2012 |
| EP | 2537779 A1 | 12/2012 |
| EP | 2559636 A1 | 2/2013 |
| EP | 2647317 A1 | 10/2013 |
| EP | 2720961 A1 | 4/2014 |
| EP | 2750876 A1 | 7/2014 |
| EP | 2752372 A1 | 7/2014 |
| EP | 2809006 A1 | 12/2014 |
| EP | 2909088 A1 | 8/2015 |
| EP | 2971319 A1 | 1/2016 |
| EP | 2996522 A1 | 3/2016 |
| FR | 2556323 A1 | 6/1985 |
| FR | 2912124 A1 | 8/2008 |
| FR | 2946854 A3 | 12/2010 |
| FR | 2963332 A1 | 2/2012 |
| GB | 1402799 A | 8/1975 |
| GB | 2061174 A | 5/1981 |
| GB | 2482032 A | 1/2012 |
| GB | 2485575 A | 5/2012 |
| GB | 2489409 A | 10/2012 |
| GB | 2499201 A | 8/2013 |
| JP | S6266714 A | 3/1987 |
| JP | S62-130649 A | 6/1987 |
| JP | S62-168512 A | 7/1987 |
| JP | H0-1233688 A | 9/1989 |
| JP | 02289207 A | 11/1990 |
| JP | H0394377 A | 4/1991 |
| JP | H04176311 A | 6/1992 |
| JP | H05502817 A | 5/1993 |
| JP | H06510682 A | 12/1994 |
| JP | H07107915 A | 4/1995 |
| JP | 2779653 A | 7/1998 |
| JP | H11342078 A | 12/1999 |
| JP | 2001-017094 A | 1/2001 |
| JP | 2001-082699 A | 3/2001 |

(56) References Cited

FOREIGN PATENT DOCUMENTS

| | | |
|---|---|---|
| JP | 2001-250161 A | 9/2001 |
| JP | 2002-274000 A | 9/2002 |
| JP | 2002-347852 A | 12/2002 |
| JP | 2003-522567 A | 7/2003 |
| JP | 2003-235733 A | 8/2003 |
| JP | 2003-265320 A | 9/2003 |
| JP | 2004-097015 A | 4/2004 |
| JP | 2004-533305 A | 11/2004 |
| JP | 2005-199071 A | 7/2005 |
| JP | 2006-510682 A | 3/2006 |
| JP | 2007-522856 A | 8/2007 |
| JP | 2007-530107 A | 11/2007 |
| JP | 2008-054840 A | 3/2008 |
| JP | 2008054840 A * | 3/2008 |
| JP | 2008-510540 A | 4/2008 |
| JP | 2009-511143 A | 3/2009 |
| JP | 2010-005003 A | 1/2010 |
| JP | 2010-500199 A | 1/2010 |
| JP | 2010-507418 A | 3/2010 |
| JP | 2010-516364 A | 5/2010 |
| JP | 2010-523205 A | 7/2010 |
| JP | 2010-528635 A | 8/2010 |
| JP | 2010-528737 A | 8/2010 |
| JP | 2011-530321 A | 12/2011 |
| JP | 4944545 B2 | 6/2012 |
| JP | 2013-529524 A | 7/2013 |
| JP | 2013-538609 A | 10/2013 |
| JP | 2014-504537 A | 2/2014 |
| JP | 2015-085086 A | 5/2015 |
| JP | 2015-516198 A | 6/2015 |
| JP | 2017-507704 A | 3/2017 |
| JP | 2017-512082 A | 5/2017 |
| KR | 1020050107747 A | 11/2005 |
| KR | 20120114738 A | 10/2012 |
| MX | PA03011894 A | 3/2004 |
| NZ | 596919 A | 11/2013 |
| RU | 2005100732 A | 6/2006 |
| RU | 2380999 C2 | 2/2010 |
| RU | 2487067 A | 4/2012 |
| WO | 98/04460 A1 | 2/1998 |
| WO | 98/51396 A1 | 11/1998 |
| WO | 99/58035 A1 | 11/1999 |
| WO | 2001/60712 A1 | 8/2001 |
| WO | 01/64416 A1 | 9/2001 |
| WO | 01/99047 | 12/2001 |
| WO | 2011/147553 A1 | 12/2001 |
| WO | 02/078498 A1 | 10/2002 |
| WO | 03/073896 A1 | 9/2003 |
| WO | 2004/082390 A1 | 9/2004 |
| WO | 2005/044067 A1 | 5/2005 |
| WO | 2005/079638 A1 | 9/2005 |
| WO | 2006/014936 A2 | 2/2006 |
| WO | 2006/053635 A1 | 5/2006 |
| WO | 2006/121520 A2 | 11/2006 |
| WO | 2007/042414 A1 | 4/2007 |
| WO | 2007/042486 A2 | 4/2007 |
| WO | 2008/011913 A1 | 1/2008 |
| WO | 2008/090122 A2 | 7/2008 |
| WO | 2008/121489 A1 | 10/2008 |
| WO | 2008/126045 A1 | 10/2008 |
| WO | 2008/148646 A1 | 12/2008 |
| WO | 2009/084061 A1 | 7/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |
| WO | 2010/013146 A3 | 4/2010 |
| WO | 2010/041179 A2 | 4/2010 |
| WO | 2010/085824 A1 | 8/2010 |
| WO | 2010/112353 A1 | 10/2010 |
| WO | 2010/118545 A2 | 10/2010 |
| WO | 2010/138563 A1 | 11/2010 |
| WO | 2010/137952 A1 | 12/2010 |
| WO | 2010/137960 A1 | 12/2010 |
| WO | 2011/000723 A2 | 1/2011 |
| WO | 2011/012501 A1 | 2/2011 |
| WO | 2011/089049 A1 | 7/2011 |
| WO | 2011/147491 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/010317 A1 | 1/2012 |
| WO | 2012/019902 A1 | 2/2012 |
| WO | 2012/038063 A1 | 3/2012 |
| WO | 2012/080501 A1 | 6/2012 |
| WO | 2012/080928 A1 | 6/2012 |
| WO | 2012/100975 A1 | 8/2012 |
| WO | 2012/100977 A1 | 8/2012 |
| WO | 2012/104760 A1 | 8/2012 |
| WO | 2012/123106 A1 | 9/2012 |
| WO | 2012/127233 A2 | 9/2012 |
| WO | 2012/135204 A1 | 10/2012 |
| WO | 2012/174331 A1 | 12/2012 |
| WO | 2012/175985 A1 | 12/2012 |
| WO | 2013/008012 A2 | 1/2013 |
| WO | 2013/029184 A1 | 3/2013 |
| WO | 2013/032330 A1 | 3/2013 |
| WO | 2013/043048 A1 | 3/2013 |
| WO | 2013/053757 A1 | 4/2013 |
| WO | 2013/064988 A1 | 5/2013 |
| WO | 2013/136209 A1 | 9/2013 |
| WO | 2013/149354 A2 | 10/2013 |
| WO | 2013/171663 A1 | 11/2013 |
| WO | 2013/189555 A1 | 12/2013 |
| WO | 2013/189923 A1 | 12/2013 |
| WO | 2014/001563 A1 | 1/2014 |
| WO | 2014/001564 A1 | 1/2014 |
| WO | 2014/006048 A2 | 1/2014 |
| WO | 2014/007639 A1 | 1/2014 |
| WO | 2014/049143 A2 | 4/2014 |
| WO | 2014/067507 A2 | 5/2014 |
| WO | 2014/090567 A1 | 6/2014 |
| WO | 2014/102702 A1 | 7/2014 |
| WO | 2014/127863 A1 | 8/2014 |
| WO | 2014/128205 A1 | 8/2014 |
| WO | 2014/128542 A1 | 8/2014 |
| WO | 2014/131779 A1 | 9/2014 |
| WO | 2014/163497 A1 | 10/2014 |
| WO | 2012/000878 A2 | 1/2015 |
| WO | 2015/028425 A2 | 3/2015 |
| WO | 2015/039258 A1 | 3/2015 |
| WO | 2015/062703 A1 | 5/2015 |
| WO | 2015/075584 A1 | 5/2015 |
| WO | 2015/107484 A1 | 7/2015 |
| WO | 2015/124619 A1 | 8/2015 |
| WO | 2015/128527 A1 | 9/2015 |
| WO | 2015/193774 A1 | 12/2015 |
| WO | 2016/012562 A1 | 1/2016 |
| WO | 2016/077916 A1 | 5/2016 |
| WO | 2016/174671 A1 | 11/2016 |
| WO | 2016/186493 A1 | 11/2016 |
| WO | 2016/207845 A1 | 12/2016 |
| WO | 2008/107645 A2 | 9/2018 |

OTHER PUBLICATIONS

International Preliminary Report on Patentability for International Application No. PCT/EP2016/063186, dated May 3, 2017.
Rawle, Alan, "Particle Sizing—An Introduction" 2012; Silver Colloids, Edition or volume on Colloidal Silver.

* cited by examiner

PORTION CAPSULE WITH A THREE-PLY NONWOVEN FABRIC

FIELD

The present invention relates to a portion capsule for the production of a beverage, having a capsule body having a capsule base and a filling side, wherein a cavity for receiving a pulverulent, granulate or liquid beverage substrate is configured between the capsule base and the filing side, and wherein a filter element is disposed between the beverage substrate and the capsule base.

BACKGROUND

Such portion capsules are generally known from the prior art. For example, generic portion capsules for preparing coffee and espresso are disclosed in publications EP 1792850 B1, EP 1344722 A1 und US 2003/0172813 A1.

Portion capsules of this type for the production of a beverage are preferably shaped in the manner of a truncated cone or In a cylindrical manner, and are produced, for example, from a vacuum-formed plastic film or by the plastic injection-molding method. Said portion capsules usually have an open filling side having a collared periphery onto which a film lid is sealed or adhesively bonded, a closed or open capsule base, wherein a particle sieve that is supported in relation to the capsule base is disposed between the beverage substrate and the capsule base.

For the preparation of a beverage, for example of a coffee or tea beverage, the portion capsule is incorporated into a brewing chamber of a preparation apparatus. After or during the closing procedure of the brewing chamber, the capsule is opened, preferably on the closed base side thereof, by means of a discharge mandrel that is disposed in the brewing chamber, and after the brewing chamber has been sealed the filling side of the portion capsule that is closed by way of a closure film is broached by means of piercing means. Preparation liquid, preferably hot water, is subsequently conveyed under pressure into the portion capsule. The preparation fluid percolates through the beverage substrate and extracts and/or dissolves the substances from the beverage substrate that are required for the preparation of the beverage. A brewing water pressure of, for example, up to 20 bar acts on the coffee powder in order for the essential oils to be extracted for the preparation of an espresso. This pressure furthermore also acts on the filter medium that lies between the coffee powder and the capsule base and ahead of the pierced capsule outlet.

The sudden loss of pressure on the lower side of the filter medium leads to the formation of foam in the beverage, for example in the form of a crema of a coffee beverage. However, for certain beverages, for example for the classic filter coffee without crema, which is consumed in particular in the USA and Scandinavia, any formation of foam is undesirable.

It was therefore the object of the present invention to provide a portion capsule having a filter arrangement which as compared to the prior art has an improved filter element.

SUMMARY

This object is achieved by a portion capsule for the production of a beverage, having a capsule body having a capsule base and a filling side, wherein a cavity for receiving a pulverulent or liquid beverage substrate is configured between the capsule base and the filling side, wherein a filter element is disposed between the beverage substrate and the capsule base, wherein the filter element is provided so as to be in at least three layers and a fibrous layer that is produced by hot air spinning is provided between two layers.

The filter element of the portion capsule according to the invention is distinguished by a high mechanical stability at a comparatively high air permeability. At the same time, a small pore size can be present on that side that faces the beverage substance such that effective filtering is achieved on account thereof and no fine particles are washed from the capsule into the beverage, which fine particles would lead to an undesirable contamination of the beverage, for example.

The portion capsule in the context of the present invention comprises a preferably hermetically tight portion capsule. This means that the beverage or foodstuff powder, for example coffee powder, soup powder, or tea, that is located in the portion capsule prior to the extraction procedure is sealed in a substantially aroma-tight manner in relation to the environment. The portion capsule can have prefabricated openings which, however, prior to the use of the capsule are preferably sealed either by a film that is fastened to the portion capsule or by packaging, for example by tubular bag packaging, which entirely encloses the portion capsule.

The filter element according to the invention is provided in three plies, wherein a fibrous layer that is produced by hot air spinning is provided between two, in particular external, layers. Said fibrous layer preferably connects the other two layers in particular in a materially integral manner.

Furthermore according to the invention, one ply of the filter element, preferably the central ply, is produced by hot air spinning (met-blown method). Hot air spinning (melt-blown spinning) Is a process in which nonwoven materials are produced directly from granulate. A special spinning method is used in combination with high-velocity hot air in order for fine fibrous fabrics materials having various structures to be produced. For example, polymer granulate that is melted in an extruder is conveyed by a pump directly into a nozzle block. The polymer, after exiting through the nozzle tip, is oriented by compressed process hot air. The nonwoven fabric created, in particular a micro-fiber nonwoven fabric, can be deposited on an air permeable carrier, for example a screen belt, or directly onto one of the in particular external layers in order for the three-ply filter element to be produced. To this end, the melt-blown plant in this instance is upgraded with an unwinding station for at least one external layer ahead and/or behind the nozzle. The still soft, sticky central layer preferably connects the two external layers as the latter cool down. Additionally, a calendar can interconnect the external layers and the met-blown layer, or mechanically stabilize said layers, respectively.

The layer that is produced by hot air spinning is preferably produced from polypropylene and has a grammage between 5 and 50, preferably 10 and 20, and particularly preferably 13 and 17 $g/m^2$.

The two, in particular external, layers are preferably provided as a nonwoven fabric.

A nonwoven fabric in the context of the invention is an unorderly not-woven structure from fibers, in particular plastic fibers. And nonwoven fabric in the context of the invention can be made from plastic and/or natural fibers. For example, a nonwoven fabric can be composed of paper or paper-like materials. However, the fibers of the nonwoven fabric are preferably plastic fibers, in particular polypropylene and/or polyester fibers.

The two nonwoven plies in terms of material, thickness, and or diameter are preferably dissimilar. The two plies are preferably interconnected by the inter-disposed melt-blown layer. The composite can be generated or improved by calendaring, for example punctiform and/or structuring calendaring.

According to one preferred embodiment of the present invention it is provided that both in particular external layers comprise a nonwoven material that is produced from plastic fine fibers, for example polyester and/or polypropylene fine fibers, said nonwoven material being in particular a random fiber and/or fiber-oriented nonwoven material. The nonwoven fabric preferably comprises a grammage (also referred to as the area weight) between 5 and 250 grams per square meter, particularly preferably between 10 and 175 grams per square meter, and particularly preferably between 13 and 130 grams per square meter. A ply of the filter element preferably has a thickness between 0.2 and 2.0 millimeters, particularly preferably between 0.6 and 1.0 millimeters. The nonwoven fabric is configured in such a manner that the air permeability of the nonwoven fabric at 200 Pascal is preferably between 950 and 1150 l/(m² s). In a surprising and unforeseen manner, it has been demonstrated that optimal results in terms of extraction efficiency, mixing and discharge behavior as well as clogging resistance are to be achieved using nonwoven materials of this type, and the "crema" if required is nevertheless formed. Despite this, the beverage substance is positively retained even when the opening mandrel pierces and/or penetrates the filter element, or has a high mechanical stability, respectively.

The first layer that faces the beverage substance is preferably a nonwoven layer having a grammage between 5 and 50, preferably 10 and 20, and particularly preferably 13 and 17 g/m². The preferred plastic for this layer is polypropylene.

The third layer that faces away from the beverage substance is preferably a nonwoven layer having a grammage between 55 and 175, preferably 80 and 150, and particularly preferably 120 and 130 g/m². The preferred plastic for this layer is polyester.

The central layer is preferably a nonwoven layer having a grammage between 5 and 50, preferably 10 and 20, and particularly preferably 13 and 17 g/m*. The preferred plastic for this layer is polypropylene.

The first and/or the third and/or the entire filter element are/Is preferably calendared. This can be punctiform, planar, and/or structuring calendaring.

The air permeability of the entire filter element is preferably 950 to 1150l/m² s at a pressure differential of 200 Pa.

The thickness of the filter element is preferably 0.6 to 1.0 mm.

According to a further embodiment of the present invention, the filter element has at least one layer having a felt structure. This herein is preferably a needle felt structure. The felt 35 layer is preferably composed of at least one felt structure and one carrier structure, in particular a woven fabric structure, wherein particularly preferably the felt structure, at least a part-portion of the volume, comprises the carrier structure. The felt structure extends preferably across the entire cross-section of the carrier structure. The felt structure is preferably connected to the carrier structure in a form-fitting, force-fitting and/or materially integral manner.

The surface of the felt structure or of the nonwoven fabric is preferably treated, for example heat treated, in order for loose fibers to be heat-set, for example.

The ply which comprises the felt structure is preferably connected to the nonwoven ply or to a further felt ply, in particular by way of a materially integral connection. The materially integral connection herein can be performed by way of the melt-blown layer and/or by calendaring.

A felt layer which comprises a carrier structure, in particular a woven fabric structure, and a felt structure, is produced, for example, in that a woven fabric structure that is composed of longitudinal and transverse threads is provided. Fiber units of 0.8 to 7 dtex are preferably selected for the construction of a felt, in particular of a needle felt. Connecting the individual fibers with one another so as to form a felt and/or anchoring the latter in the carrier structure preferably takes place by the production process of needling. Herein, needles are driven into the supplied fiber pack at a high velocity, using reversed barbs, said needles thereafter being withdrawn again. On account of the barbs, the fibers by way of a multiplicity of loops that are created are interlaced with one another and/or with the woven carrier fabric.

The carrier structure having one or a plurality of felt structures preferably comprises a grammage (also referred to as area weight) between 100 and 1500 grams per square meter, particularly preferably between 200 and 650 grams per square meter, and most particularly preferably substantially from 150 to 250 grams per square meter for the production of tea but also for coffee, espresso, and the like, and 600 to 700 grams per square meter for the production of coffee, espresso, but also for tea. The grammage is most particularly preferably 1000 to 1300 grams per square meter for the production of coffee, espresso, or the like, but also for tea. The ply comprising the felt structure preferably has a thickness between 0.4 and 5.0 millimeters, particularly preferably between 1.1 and 3.0 millimeters, and most particularly preferably 1.2 to 1.4 millimeters for the production of tea, and 2.6 to 3.0 for the production of coffee.

The filter element is preferably placed into the capsule body and is subsequently connected to the latter and/or to the side wall of the capsule in particular by welding, for example using ultrasound, prior to the beverage substrate being filled into the capsule body.

The filter element is preferably disposed on the base of the capsule such that said filter element bears thereon over as large an area as possible. The filter element is particularly preferably sealed to the base, in particular by ultrasound. Furthermore preferably, the filter element prior to being fastened to the capsule, in particular to the capsule base, is tensioned in order for the bearing of said filter element on the base to be improved.

The filter element preferably covers the capsule base entirely or only partially.

When the capsule is opened by a perforation means it is advantageous for the latter to move the filter element away from the capsule base, hereby tensioning or additionally tensioning said filter element. The perforation means herein can invade at least one ply of the filter element and/or penetrate at least one ply of the filter element.

The capsule body is preferably shaped in the manner of a truncated cone or in a cylindrical manner, and is produced for example from plastic, from a natural material, and/or from a biologically degradable material, from a vacuum formed plastic film, or is formed from a natural material, or is produced by the injection-molding method. The capsule body preferably on the filling side has a collared periphery onto which a film lid is sealed or adhesively bonded. Alternatively, it is conceivable that the capsule body and a capsule lid are interconnected by means of a mechanical method. The base of the portion capsule is preferably closed and is preferably only perforated when in the brewing chamber, by means of a perforation means that acts from the outside on the portion capsule base, in order for a discharge opening to be generated. Alternatively however, it would be likewise conceivable that base of the portion capsule is already provided with a discharge opening ex-works, which is preferably sealed by means of a film seal. In this instance, the film seal can be perforated, for example by means of the perforation means, or can be torn off by hand from the capsule base. The filter element is preferably configured so as to be tear-resistant. The film seal is preferably a plastic film which has at least one barrier layer, for example a metal layer, in particular an aluminum layer. The plastic film, preferably on that side thereof that faces the capsule, has a peel-off layer in order for the plastic film to be able to be released from the capsule base in a comparatively easy manner.

The prefabricated discharge opening is preferably provided to be so large that said discharge opening can receive an optionally present perforation means in a non-contacting manner. The discharge opening is particularly preferably provided to be so large that no noticeable pressure loss is created on said discharge opening when the fully prepared beverage flows out, in particular such that no noticeable turbulence that could lead to an input of gas into the beverage and thus to the formation of foam arises in the fully prepared beverage.

The portion capsule preferably has a liquid distributor which deflects the inflowing liquid and distributes the latter across the cross-section of the portion capsule.

According to a further embodiment of the present invention it is provided that the capsule base has a convexity in a direction that is opposite to the filling side. The convexity advantageously serves for receiving the perforation means such that the capsule base in the region of the convexity is indeed perforated when the perforation means pierces the capsule base, but the perforation means subsequently remains in the cavity of the convexity. Preferably, at least one ply of the filter element is broached and/or pierced herein. The convexity preferably receives the filter element at least in part.

According to a further embodiment of the present invention it is provided that the filter element is raised from the capsule base only in a central region, and in the peripheral region of the capsule base continues to bear on the capsule base or is fastened to the capsule base. Slipping of the filter element is thus advantageously prevented, and the sealing effect between the capsule body and the filter element is increased, wherein at the same time however any raising of the filter element in the central region thereof continues to be enabled. The filter element herein is preferably configured so as to be elastic.

According to a further embodiment the capsule base permanently has an exit opening which is preferably sealed by a film, wherein the film particularly preferably has a tear-off tab for tearing off the film by hand. A perforation of the capsule base by means of an external perforation means is advantageously not required herein. Prior to the portion capsule being placed into the brewing chamber, the film by means of the tear-off tab is simply torn from the capsule base, and the brewing procedure can be started. The combination of a prefabricated and thus comparatively large exit opening with a filter element from one or a plurality of nonwoven plies and/or a ply having a felt structure, in particular needle felt, has the advantage that the beverage liquid does not flow out of the exit opening at a high pressure and the formation of foam ("crema") is therefore prevented in particular in the production of American coffee or of tea.

A further subject matter of the present invention is a method for the production of a beverage wherein in the first step a portion capsule according to the invention is provided, wherein in a second step the portion capsule is placed into a brewing chamber, and wherein in a third step for the production of the beverage a preparation liquid is directed into the portion capsule at a pressure of up to 20 bar.

The explanations made in the context of one subject matter of the present invention apply equally to the other subject matter and vice versa.

A further subject matter of the present invention is the use of a portion capsule for the production of a beverage, preferably for the production of a coffee, cocoa, tea, and or milk beverage.

The explanations made in the context of one subject matter of the present invention apply equally to the other subject matter and vice versa.

BRIEF DESCRIPTION OF THE DRAWINGS

Exemplary embodiments of the invention are illustrated in the figures and are explained in more detail in the description hereunder. The figures are described in a merely exemplary manner and do not limit the general concept of the invention. In the figures.

Identical parts are at all times provided with the same reference signs in the various figures, and are in each case therefore typically also referred to or mentioned only once, respectively.

DETAILED DESCRIPTION

Figure 1:
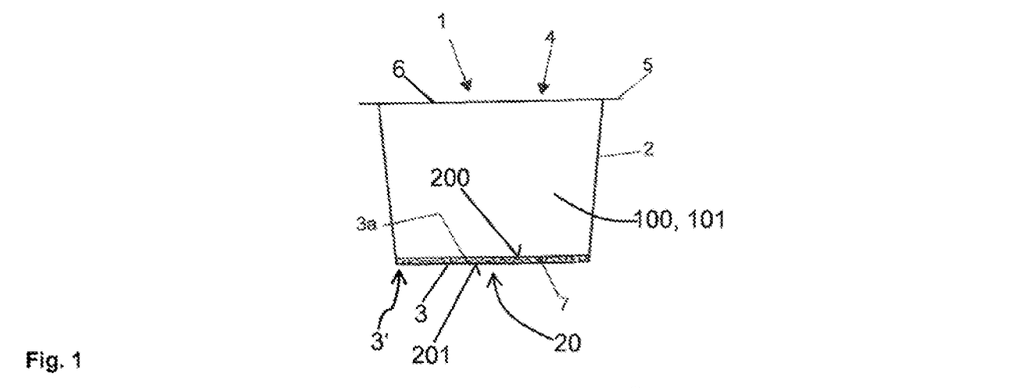
FIG. 1 shows a longitudinal section through a portion capsule according to one exemplary embodiment of the present invention, said portion capsule being specified for the preparation of coffee.

An exemplary embodiment of the portion capsule 1 according to the invention is illustrated in FIG. 1. The portion capsule 1 comprises a capsule body 2 in the shape of a truncated cone, having a capsule base 3 and a collared periphery 5 that is disposed on the filing side 4 of said capsule body, a film lid 6 being welded or adhesively bonded to said collared periphery 5. The capsule base 3 in the initial state is either closed, or in the initial state thereof already has an exit opening 20 which is sealed, for example by means of a film seal (not illustrated) that can be torn off prior to the extraction procedure or is perforatable in the brewing chamber. A cavity 100 that in the initial state of the portion capsule 1 is preferably closed in an airtight and aroma-tight manner is thus configured between the capsule base 3 and the film lid 6, said cavity 100 being filled with a pulverulent, leaf-shaped, and or granular beverage substance 101. The beverage substance 101 herein comprises coffee and/or tea. A filter element 7 is disposed on the internal side 3a of the capsule base 3, that is to say within the cavity 100. The filter element either bears loosely on the internal side 3a of the capsule base 3, or is connected in a fixed manner, that is to say preferably in a materially integral manner, to the internal side 3a of the capsule body base 3. The filter element 7 in the second variant is fastened in a materially integral manner to the capsule base 3 in particular only in a peripheral region 3' of the capsule base 3. The filter element is explained in a detailed manner by means of FIG. 3. The filter element 7 is preferably cut out of a woven fabric web by means of punching, laser cutting, water-Jet cutting, ultrasonic cutting and/or the like.

Figure 2:
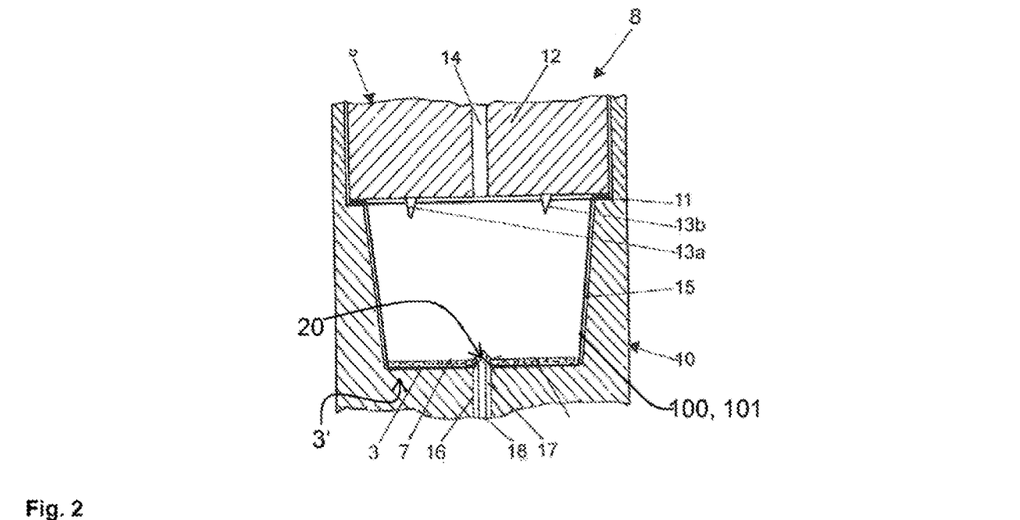
FIG. 2 shows a longitudinal section through a portion capsule according to the exemplary embodiment of the present invention, said portion capsule lying in a closed brewing chamber.

A portion capsule 1 according to the exemplary embodiment of the present invention as illustrated in FIG. 1 is illustrated in FIG. 2, wherein the portion capsule 1 in FIG. 2 is disposed in a closed brewing chamber 8. The brewing chamber 8 is composed of a first brewing chamber element 9 and of a second brewing chamber element 10, wherein the first brewing chamber element 9 is provided so as to be movable in relation to the second brewing chamber element 10, or vice versa, in order for the portion capsule 1 to be introduced. A seal 11 is disposed between the two brewing chamber elements 9, 10. The first brewing chamber element 9 is composed substantially of a closing piston 12 having piercing elements 13a, 13b for opening the film lid 6 of the portion capsule 1, of a preparation liquid infeed 14, and of the seal 11. The second brewing chamber element 10 is composed substantially of a brewing chamber dome 15, that partially encloses the portion capsule 1, having a discharge mandrel 16 that is disposed on the base of the brewing chamber dome 15 and is provided with discharge grooves 17, and of a beverage discharge 18. In order for the portion capsule 1 to be received, the brewing chamber 8 is in an open state (not illustrated) in which the first and the second brewing chamber element 9, 10 are mutually spaced apart in order for infeeding of the portion capsule 1 to be guaranteed, and in the closed state illustrated, in which a preparation procedure for the production of a beverage by means of the portion capsule 1 can be carried out. The brewing chamber 8 in the closed state is closed in a pressure-tight manner. When the brewing chamber 8 is converted from the open state to the closed state illustrated, the film lid 6 is pierced by the piercing elements 13a, 13b such that preparation liquid, in particular hot brewing water, by way of the preparation liquid infeed 14 makes its way under pressure into the cavity 100 of the portion capsule 1. When the portion capsule 1 has a closed capsule base 3, the capsule base 3 as the brewing chamber 8 is closed is preferably perforated by a perforation means that is configured as a discharge mandrel 16 such that an exit opening 20 through which the beverage liquid produced can emerge from the portion capsule 1 in the direction of the beverage discharge 18 is created in the capsule base 3, in order for the drainage of the beverage liquid to be supported, the discharge mandrel 16 on the shelf face thereof has the discharge grooves 17. In an alternative embodiment (not illustrated) the capsule base 3 has an exit opening 20 which in the initial state is sealed by a film seal in order for the cavity 100 to be sealed in a hermetically tight manner. Prior to the portion capsule 1 being placed into the brewing chamber 8, the film seal is torn off by hand by a user such that the discharge mandrel 16 by way of the exit opening 8 can protrude in an unimpeded manner into the portion capsule 1. Alternatively, it is however also conceivable that the film seal is not manually removed by the user but is perforated by the discharge mandrel 16 as the brewing chamber 8 is closed. The preparation liquid that enters the cavity 100 at a pressure of up to bar interacts with the beverage substance 101 within the cavity 100, on account of which the beverage is formed. The beverage subsequently flows through the filter element 7 and through the exit opening 20 out of the portion capsule 1. Advantageously, the formation of crema herein is effectively avoided by virtue of the novel filter element 7, despite the brewing chamber 8 being operated at a pressure of up to 20 bar. The filter element, when being broached, can be broached and/or pierced. Moreover, said filter element can be raised from the base of the portion capsule by the broaching mandrel, in particular can be raised in the center, wherein the periphery of the filter element remains on the base of the portion capsule.

Figure 3:
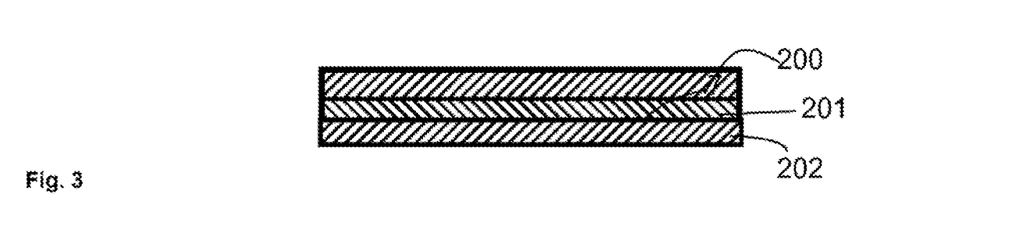
FIG. 3 shows an embodiment of the filter element of the portion capsule according to the exemplary embodiment of the present invention.

FIG. 3 shows an embodiment of the filter element according to the present invention. It can be clearly seen that said filter element has three plies 201 to 202. The ply 200 faces the beverage substance, while the ply 202 is directed in the direction of the capsule base. The two external plies 200 and 202 are composed of a spun-bonded nonwoven material and are preferably prefabricated. The two plies 200 and 202 are preferably provided so as to be dissimilar. In the present case, the first ply 200 is composed of polypropylene and has a grammage of, for example, 15 g/m². The third ply 202 in the present case in case is composed of polyester and has a grammage of, for example, 125 g/m². The plies can be calendared, wherein punctiform or structuring calendaring can be considered.

A nonwoven ply which is produced by hot air spinning (met-blown method) is located between the two external plies 200 and 202. Hot air spinning (melt-blown spinning) is a process in which not-woven materials are made directly from granules. A special spinning method is utilized in combination with high-velocity hot air in order for fine-fiber materials having dissimilar structures to be produced. In the present case, polypropylene granulate that is melted in an extruder is conveyed into a nozzle block by a pump. Upon exiting through the nozzle tip, the polymer threads created are oriented by process hot air. The micro-fiber nonwoven fabric created is deposited directly on one of the external layers 200, 202 in order for the three-ply filter element to be produced. To this end, the melt-blown plant in this instance is upgraded with an unwinding station for at least one external layer ahead of the nozzle and one unwinding station behind the nozzle. The still soft sticky central layer preferably connects the two external layers as the latter cool down. A calendar additionally interconnects the external layers and the melt-blown layer, and stabilizes said layers in a mechanical manner. Said calendar can be a punctiform and/or structuring calendar. In the present case, the first ply 201 is composed of polypropylene and has a grammage of, for example, 15 g/m².

LIST OF REFERENCE SIGNS

1 Portion capsule
2 Capsule body
3 Capsule base
3a Internal side
3' Peripheral region
4 filing side
Peripheral collar
6 Film lid
7 Filter element
8 Brewing chamber
9 First brewing chamber element
Second brewing chamber element
11 Seal
12 Closing piston
13a Piercing elements
13b Piercing elements
14 Preparation liquid infeed
15 Brewing chamber dome
16 Discharge mandrel
17 Discharge grooves
18 Beverage discharge
20 Exit opening 100 Cavity
101 Beverage substance
200 first layer, first nonwoven layer
201 Second fibrous layer produced by hot air spinning
202 Third layer, third nonwoven layer

The invention claimed is:

1. A portion capsule for production of a beverage, comprising:
   a capsule body having a capsule base and a filling side;
   a cavity receiving a pulverulent or liquid beverage substrate is configured between the capsule base and the filling side;
   a filter element disposed between the beverage substrate and the capsule base; and
   a liquid distributor;
   wherein the filter element comprises at least three layers;
   wherein a first layer of the filter element that faces the beverage substrate is composed of polypropylene and has a grammage of 15 $g/m^2$;
   wherein a third layer of the filter element that faces away from the beverage substrate is composed of polyester and has a grammage of 125 $g/m^2$;
   wherein a central layer of the filter element is a nonwoven layer having a grammage between 5 and 50 $g/m^2$;
   wherein the central layer is fibrous and is produced by hot air spinning, the central layer is provided between the first and third layers of the filter element; and
   wherein an air permeability of the filter element at a pressure differential of 200 Pa is 950 to 1150 $l/m^2$ s.

2. The portion capsule as claimed in claim 1, wherein the third layer of the filter element is made from polyester fibers, and the central layer is made from polypropylene.

3. The portion capsule as claimed in claim 1, wherein the first layer of the filter element and/or the third layer of the filter element and/or the entire filter element are/is calendared.

4. The portion capsule as claimed in claim 1, wherein a thickness of the filter element is 0.6 to 1.0 mm.

5. The portion capsule as claimed in claim 1, wherein the entire filter element is calendared.

6. The portion capsule as claimed in claim 1, wherein the first layer and the third layer of the filter element are nonwoven layers.

7. The portion capsule as claimed in claim 1, wherein the central layer of the filter element has a grammage between 10 and 20 $g/m^2$.

8. The portion capsule as claimed in claim 7, wherein the central layer of the filter element has a grammage between 13 and 17 $g/m^2$.

9. The portion capsule as claimed in claim 1, wherein the first layer of the filter element and/or the third layer of the filter element are/is a nonwoven layer.

10. The portion capsule as claimed in claim 9, wherein the first and the third nonwoven layers are dissimilar.

11. The portion capsule as claimed in claim 9, wherein the first layer of the filter element that faces the beverage substrate is a nonwoven layer.

12. The portion capsule as claimed in claim 9, wherein the third layer of the filter element that faces away from the beverage substrate is a nonwoven layer.

13. A method for production of a beverage, comprising:
    in a first step, providing the portion capsule as claimed in claim 1,
    in a second step, placing the portion capsule into a brewing chamber, and
    in a third step, directing a preparation liquid into the portion capsule at a pressure of up to 20 bar.

14. The use of the portion capsule as claimed in claim 1, comprising producing a beverage, wherein the beverage is a coffee and/or tea beverage.

* * * * *